(12) United States Patent
Fukunaga

(10) Patent No.: US 10,453,610 B2
(45) Date of Patent: Oct. 22, 2019

(54) MULTILAYER CERAMIC CAPACITOR

(71) Applicant: Murata Manufacturing Co., Ltd., Nagaokakyo-shi, Kyoto-fu (JP)

(72) Inventor: Daiki Fukunaga, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 28 days.

(21) Appl. No.: 15/728,568

(22) Filed: Oct. 10, 2017

(65) Prior Publication Data

US 2018/0102217 A1 Apr. 12, 2018

(30) Foreign Application Priority Data

Oct. 11, 2016 (JP) .................................. 2016-199733

(51) Int. Cl.
*H01G 4/30* (2006.01)
*H01G 4/12* (2006.01)
*H01G 4/248* (2006.01)

(52) U.S. Cl.
CPC ........... *H01G 4/1227* (2013.01); *H01G 4/248* (2013.01); *H01G 4/30* (2013.01)

(58) Field of Classification Search
CPC ............ H01G 4/12; H01G 4/30; H01G 4/224; H01G 4/248; H01G 4/1209; H01G 4/1227; H01G 4/1245
See application file for complete search history.

(56) References Cited

U.S. PATENT DOCUMENTS

| 7,394,646 | B2* | 7/2008 | Tonogai | H01G 4/30 361/303 |
| 2012/0307418 | A1* | 12/2012 | Kim | H01G 4/30 361/321.2 |
| 2014/0209362 | A1* | 7/2014 | Park | H01G 2/065 174/260 |
| 2015/0049413 | A1* | 2/2015 | Wada | H01G 4/12 361/301.4 |
| 2015/0340155 | A1 | 11/2015 | Fukunaga et al. | |
| 2016/0111213 | A1* | 4/2016 | Okamoto | B32B 18/00 361/301.4 |

FOREIGN PATENT DOCUMENTS

JP 2011-057511 A 3/2011
KR 10-2015-0134274 A 12/2015

* cited by examiner

*Primary Examiner* — Noah S Wiese
(74) *Attorney, Agent, or Firm* — Keating & Bennett, LLP

(57) ABSTRACT

A multilayer ceramic capacitor with improved moisture resistance includes a laminate in which dielectric ceramic layers and internal electrodes are alternately stacked, and a pair of external electrodes provided on corresponding outer portions of the laminate. Each dielectric ceramic layer positioned between the internal electrodes, a first region positioned between the internal electrode and a first side surface in a width direction, and a second region positioned between the internal electrode and a second side surface, contains a perovskite compound containing Ba and Ti, and at least one element selected from a group consisting of Ba, Mg, Mn and a rare-earth element. Relationships $S1<Sa$ and $S2<Sa$ are satisfied, where mole ratios of the at least one element to Ti of the dielectric ceramic layer, the first region, and the second region, are respectively designated as Sa, S1, and S2, respectively.

20 Claims, 8 Drawing Sheets

MULTILAYER CERAMIC CAPACITOR

CROSS REFERENCE TO RELATED APPLICATIONS

This application claims the benefit of priority to Japanese Patent Application No. 2016-199733 filed on Oct. 11, 2016. The entire contents of this application are hereby incorporated herein by reference.

BACKGROUND OF THE INVENTION

1. Field of the Invention

The present invention relates to a multilayer ceramic capacitor.

2. Description of the Related Art

There is known a multilayer ceramic capacitor including a laminate in which a plurality of internal electrodes and dielectric ceramic layers are alternately stacked with each other (refer to Japanese Patent Application Laid-Open No. 2011-57511). Such a multilayer ceramic capacitor is used by being mounted in an electronic apparatus such as a cellular phone. As an electronic apparatus has been reduced in size in recent years, a multilayer ceramic capacitor is also required to be reduced in size.

In addition, a multilayer ceramic capacitor is required not only to be reduced in size but also to be increased in capacitance. Methods for achieving an increase in capacitance include an increase in area of a counter region of internal electrodes facing each other with a dielectric layer interposed therebetween.

Unfortunately, an increase in area of an internal electrode reduces a distance from an edge of the internal electrode to a surface of a multilayer ceramic capacitor. Thus, when entry of moisture from the outside occurs, the entered moisture is likely to easily reach the internal electrode. This causes a problem in that the multilayer ceramic capacitor is deteriorated in moisture resistance.

SUMMARY OF THE INVENTION

Preferred embodiments of the present invention multilayer ceramic capacitors that achieve improved moisture resistance.

A multilayer ceramic capacitor according to a preferred embodiment of the present invention includes a laminate in which a plurality of dielectric layers and internal electrodes are alternately stacked with each other, and a pair of external electrodes each of which is provided on a surface of the laminate to be electrically connected to the internal electrodes extended to the surface of the laminate, the laminate including a first principal surface and a second principal surface, facing each other in a thickness direction being a lamination direction of the dielectric layers and the internal electrodes; a first end surface and a second end surface, facing each other in a lengthwise direction being a direction in which the pair of external electrodes faces each other, and being provided with the corresponding external electrodes; and a first side surface and a second side surface, facing each other in a width direction perpendicular or substantially perpendicular to the thickness direction and the lengthwise direction, the dielectric ceramic layer, a first region positioned between the internal electrode and the first side surface in the width direction, and a second region positioned between the internal electrode and the second side surface in the width direction, in portions of the laminate, including a perovskite compound containing Ba and Ti, and at least one element selected from a group consisting of Ba, Mg, Mn and a rare-earth element, relationships S1<Sa, and S2<Sa are satisfied, where a mole ratio of the at least one element to the Ti in the first region, a mole ratio of the at least one element to the Ti in the second region, and a mole ratio of the at least one element to the Ti in the dielectric ceramic layer positioned between the internal electrodes, being respectively designated as S1, S2, and Sa.

A multilayer ceramic capacitor according to a preferred embodiment of the present invention may be configured such that each of a third region positioned between the dielectric ceramic layer and the first side surface in the width direction, and a fourth region positioned between the dielectric ceramic layer and the second side surface in the width direction, in the portions of the laminate, contains a perovskite compound containing Ba and Ti, and at least one element selected from a group consisting of Ba, Mg, Mn and a rare-earth element, and relationships SS1<Sa, and SS2<Sa are satisfied, where a mole ratio of the at least one element to the Ti in the third region, and a mole ratio of the at least one element to the Ti in the fourth region, are respectively designated as SS1 and SS2.

A multilayer ceramic capacitor according to a preferred embodiment of the present invention may be configured such that a relationship S1<SS1<Sa is satisfied among the S1, the SS1, and the Sa, and a relationship S2<SS2<Sa is satisfied among the S2, the SS2, and the Sa.

A dimension of the first region in the width direction, as well as a dimension of the second region in the width direction, may be not less than about 2 μm and not more than about 30 μm.

The dielectric ceramic layer may have a thickness of not less than about 0.4 μm and not more than about 0.8 μm.

According to preferred embodiments of the present invention, a mole ratio of at least one element to the Ti, the at least one element being selected from a group consisting of Ba, Mg, Mn and a rare-earth element, and existing in the first region positioned between the internal electrode and the first side surface, and in the second region positioned between the internal electrode and the second side surface, in the width direction of the laminate, is less than a mole ratio of at least one element to the Ti, the at least one element being selected from a group consisting of Ba, Mg, Mn and a rare-earth element, and existing in the dielectric ceramic layer positioned between the internal electrodes. This structure increases density of a ceramic layer in each of the first region and the second region, so that entry of moisture through the first region and the second region each positioned outside the internal electrode in the width direction is able to be significantly reduced or prevented to enable the multilayer ceramic capacitor to be improved in moisture resistance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below to more specifically describe features of the present invention.

Figure 1:
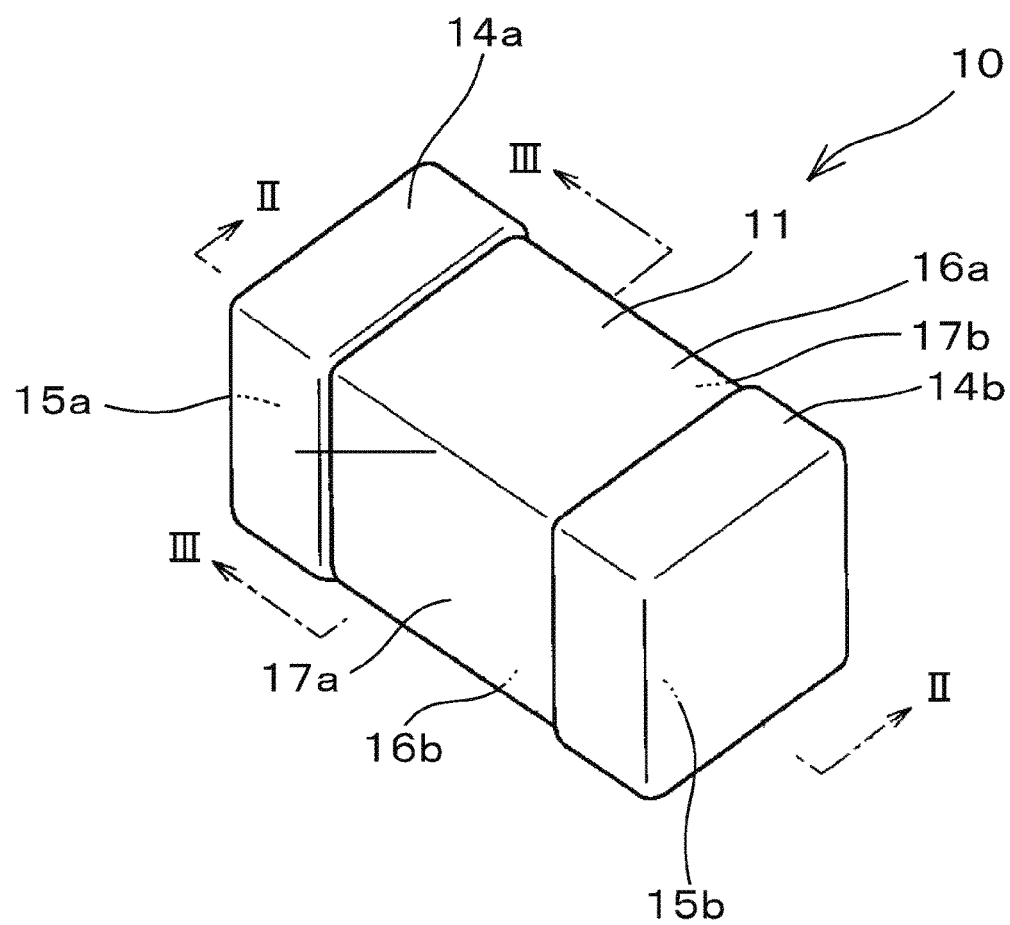
FIG. 1 is a perspective view of a multilayer ceramic capacitor in a preferred embodiment of the present invention.
Figure 2:
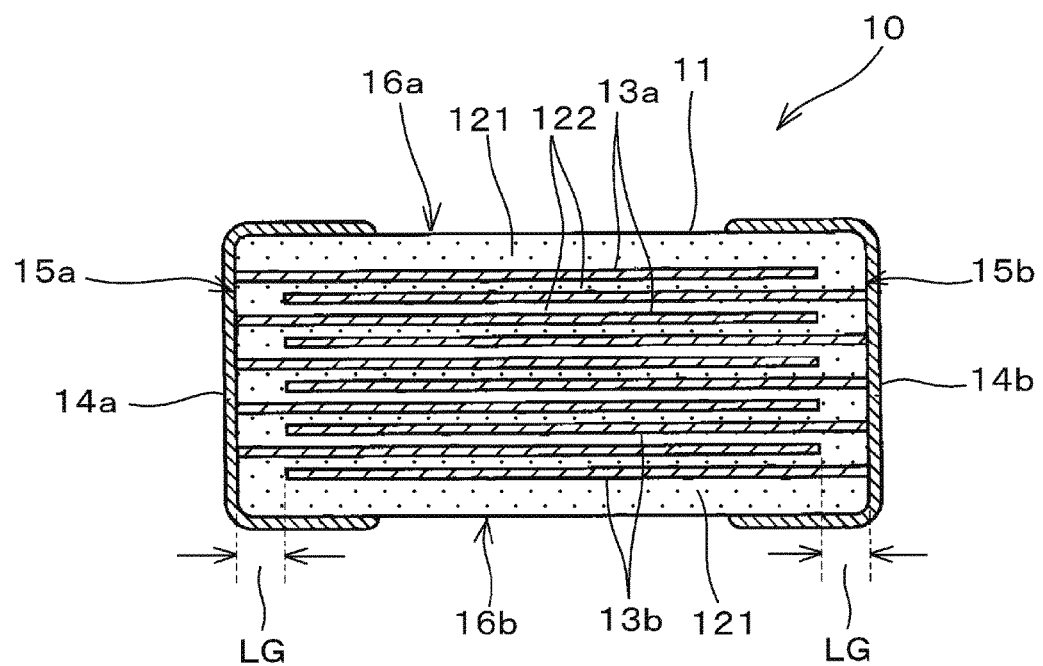
FIG. 2 is a sectional view of the multilayer ceramic capacitor illustrated in FIG. 1, taken along line II-II.
Figure 3:
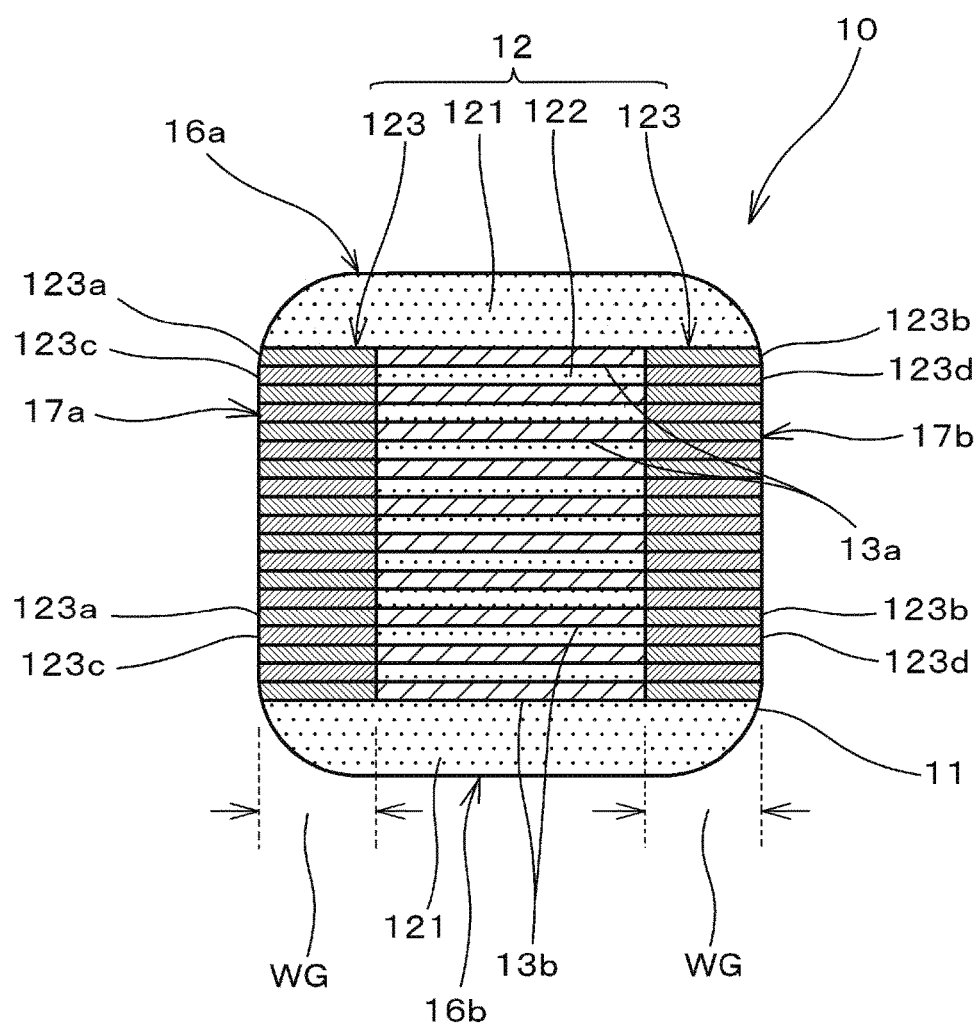
FIG. 3 is a sectional view of the multilayer ceramic capacitor illustrated in FIG. 1, taken along line III-III.

FIG. 1 is a perspective view of a multilayer ceramic capacitor 10 in a preferred embodiment of the present invention. FIG. 2 is a sectional view of the multilayer ceramic capacitor 10 illustrated in FIG. 1, taken along line II-II. FIG. 3 is a sectional view of the multilayer ceramic capacitor 10 illustrated in FIG. 1, taken along line III-III.

As illustrated in FIGS. 1 to 3, the multilayer ceramic capacitor 10 is an electronic component generally having a rectangular or substantially rectangular parallelepiped shape, and includes a laminate 11, and a pair of external electrodes 14 (14a and 14b). The pair of external electrodes 14 (14a and 14b) is disposed so as to face each other as illustrated in FIG. 1.

It is defined here that a direction in which the pair of external electrodes 14 faces each other is a lengthwise direction of the multilayer ceramic capacitor 10, a stacked direction of ceramic layers 12 and internal electrodes 13 (13a and 13b) is a thickness direction, and a direction perpendicular or substantially perpendicular to each of the lengthwise direction and the thickness direction is a width direction.

The laminate 11 includes the first end surface 15a and the second end surface 15b, facing each other in the lengthwise direction, a first principal surface 16a and a second principal surface 16b, facing each other in the thickness direction, and a first side surface 17a and a second side surface 17b, facing each other in the width direction. The first end surface 15a is provided with the external electrode 14a, and the second end surface 15b is provided with the external electrode 14b.

It is preferable that the laminate 11 includes rounded corners and rounded ridge line portions. Each of the corners is a portion at which three surfaces of the laminate 11 intersect with each other, and each of the ridge line portions is a portion at which two surfaces of the laminate 11 intersect with each other.

As illustrated in FIGS. 2 and 3, the laminate 11 includes the ceramic layers 12, the first internal electrodes 13a extended to the first end surface 15a of the laminate 11, and the second internal electrodes 13b extended to the second end surface 15b.

The ceramic layers 12 include outer ceramic layers 121 each being a region outside in the laminate 11 in the thickness direction, dielectric ceramic layers 122 each positioned between the first internal electrode 13a and the second internal electrode 13b, and crosswise outer ceramic layers 123 each being a region outside in the laminate 11 in the width direction.

The outer ceramic layer 121 is a ceramic layer positioned on each of a first principal surface 16a side and a second principal surface 16b side of the laminate 11. It is preferable that a thickness of the outer ceramic layer 121 is about 10 μm or more, for example.

The dielectric ceramic layer 122 is positioned between the first internal electrode 13a and the second internal electrode 13b, more specifically, between a counter electrode portion of the first internal electrode 13a and a counter electrode portion of the second internal electrode 13b, described below. It is preferable that a thickness of the dielectric ceramic layer 122 is not less than about 0.4 μm and not more than about 0.8 μm, for example. In addition, it is preferable that the number of dielectric ceramic layers 122 is not less than 150 and not more than 200, for example.

The ceramic layer 12 contains a perovskite compound containing Ba and Ti, and at least one element selected from a group consisting of Ba, Mg, Mn and a rare-earth element. The perovskite compound containing Ba and Ti includes ceramic grains. The at least one element selected from a group consisting of Ba, Mg, Mn and a rare-earth element is contained in an inter-ceramic-grains compound being a compound existing among the ceramic grains, for example, however, may be contained in the perovskite compound.

The perovskite compound containing Ba and Ti is expressed by the general formula, $A_mBO_3$, and is barium titanate ($BaTiO_3$), for example. In the general formula, $A_mBO_3$, the A site is Ba, and may contain at least one kind selected from a group consisting of Sr and Ca, along with Ba. The B site is Ti, and may contain at least one kind selected from a group composed of Zr and Hf, along with Ti. The O represents oxygen, and the m represents a mole ratio of between the A site and the B site.

As illustrated in FIG. 3, the crosswise outer ceramic layer 123 includes a first region 123a positioned between the internal electrode 13 and the first side surface 17a, a second region 123b positioned between the internal electrode 13 and the second side surface 17b, a third region 123c positioned between the dielectric ceramic layer 122 and the first side surface 17a, and a fourth region 123d positioned between the dielectric ceramic layer 122 and the second side surface 17b.

While the dielectric ceramic layer 122, and the third region 123c and the fourth region 123d in the crosswise outer ceramic layer 123, are positioned in a layer at the same level in the thickness direction as illustrated in FIG. 3, they are different in composition as described below, and thus they are distinguished from each other by being designated by the corresponding different names in the present specification.

In the first region 123a, it is assumed that a mole ratio of at least one element to Ti contained in the perovskite compound, the at least one element being selected from a group consisting of Ba, Mg, Mn and a rare-earth element, is designated as S1. In the second region 123b, it is assumed that a mole ratio of at least one element to Ti contained in the perovskite compound, the at least one element being selected from a group consisting of Ba, Mg, Mn and a rare-earth element, is designated as S2. In the dielectric ceramic layer 122, it is assumed that a mole ratio of at least one element to Ti contained in the perovskite compound, the at least one element being selected from a group consisting of Ba, Mg, Mn and a rare-earth element, is designated as Sa. In this instance, relationships (1) and (2) are satisfied.

$$S1<Sa \qquad (1)$$

$$S2<Sa \qquad (2)$$

In the dielectric ceramic layer 122 and the crosswise outer ceramic layer 123, from the viewpoint of a relationship of a mole ratio of at least one element to Ti contained in the perovskite compound, the at least one element being selected from a group consisting of Ba, Mg, Mn and a rare-earth element, when the mole ratio S1 in the first region 123a as well as the mole ratio S2 in the second region 123b is less than the mole ratio Sa in the dielectric ceramic layer 122, ceramic layers in the first region 123a and the second region 123b are increased in density. This enables reduction in entry of moisture toward the inside of the laminate 11 from a side surface side of the multilayer ceramic capacitor 10, more specifically from the first region 123a and the second region 123b of the crosswise outer ceramic layer 123, so that the multilayer ceramic capacitor 10 is improved in moisture resistance.

In the third region 123c, it is assumed that a mole ratio of at least one element to Ti contained in the perovskite compound, the at least one element being selected from a group consisting of Ba, Mg, Mn and a rare-earth element, is designated as SS1. In the fourth region 123d, it is assumed that a mole ratio of at least one element to Ti contained in the perovskite compound, the at least one element being selected from a group consisting of Ba, Mg, Mn and a rare-earth element, is designated as SS2. In the present preferred embodiment, relationships (3) and (4) are satisfied.

$$SS1<Sa \qquad (3)$$

$$SS2<Sa \qquad (4)$$

In the dielectric ceramic layer 122 and the crosswise outer ceramic layer 123, from the viewpoint of a relationship of a mole ratio of at least one element to Ti contained in the perovskite compound, the at least one element being selected from a group consisting of Ba, Mg, Mn and a rare-earth element, when the mole ratio SS1 in the third region 123c as well as the mole ratio SS2 in the fourth region 123d is less than the mole ratio Sa in the dielectric ceramic layer 122, ceramic layers in the third region 123c and the fourth region 123d are increased in density.

While entry of moisture is likely to occur from a boundary surface between the internal electrode 13 and the dielectric ceramic layer 122 into the inside, increase in density of the ceramic layers of the third region 123c and the fourth region 123d, positioned outside in the dielectric ceramic layer 122 in the width direction, enables reduction in entry of moisture into the laminate 11 through the third region 123c or the fourth region 123d. This enables the multilayer ceramic capacitor 10 to be further improved in moisture resistance.

In the present preferred embodiment, relationships (5) and (6) are satisfied.

$$S1<SS1<Sa \qquad (5)$$

$$S2<SS2<Sa \qquad (6)$$

When the relationships (5) and (6) are satisfied, the ceramic layer in the crosswise outer ceramic layer 123 is increased more in density as compared with the dielectric ceramic layer 122. As a result, entry of moisture into the laminate 11 from a side surface side of the multilayer ceramic capacitor 10 is able to be effectively reduced or prevented.

As described above, the laminate 11 includes the first internal electrodes 13a extended to the first end surface 15a, and the second internal electrodes 13b extended to the second end surface 15b. The first internal electrodes 13a and the second internal electrodes 13b are alternately disposed in the thickness direction with the respective dielectric ceramic layers 122 interposed therebetween.

The first internal electrode 13a includes a counter electrode portion facing the second internal electrode 13b, and an extended electrode portion provided by extending the first internal electrode 13a to the first end surface 15a of the laminate from the counter electrode portion. The second internal electrode 13b includes a counter electrode portion facing the first internal electrode 13a, and an extended electrode portion provided by extending the second internal electrode 13b to the second end surface 15b of the laminate 11 from the counter electrode portion. When the counter electrode portion of the first internal electrode 13a is opposite to the counter electrode portion of the second internal electrode 13b with the dielectric ceramic layer 122 interposed therebetween, capacitance is generated, and then they define and function as a capacitor.

The first internal electrode 13a and the second internal electrode 13b each contain at least one of Cu, Ni, Ag, Pd, an alloy of Ag and Pd, Au, and the like, for example. The first internal electrode 13a and the second internal electrode 13b each may further contain dielectric grains of the same composition system as that of ceramic contained in the ceramic layer 12.

It is preferable that a thickness of each of the first internal electrode 13a and the second internal electrode 13b is not less than about 0.4 μm and not more than about 0.7 μm, for example.

It is preferable that the number of internal electrodes including the first internal electrodes 13a and the second internal electrodes 13b is not less than 150 and not more than 200, for example. In addition, it is preferable that coverage being a ratio of the internal electrode 13 to the dielectric ceramic layer 122 covered with the internal electrode 13 is not less than about 60% and not more than about 80%, for example.

A dimension WG of the crosswise outer ceramic layer 123 (refer to FIG. 3) in the width direction is not less than about 2 μm and not more than about 30 μm, for example. Even when the dimension WG of the crosswise outer ceramic layer 123 in the width direction is about 30 μm or less, entry of moisture into the laminate 11 is able to be reduced due to the reason described above.

In addition, it is preferable that a dimension in the lengthwise direction of each of longitudinal gaps LG (refer to FIG. 2), which are regions from the corresponding leading ends of the first and second internal electrodes 13a and 13b on opposite sides to the extended electrode portions to the corresponding first and second end surfaces 15a and 15b of the laminate 11, is not less than about 10 μm and not more than about 40 μm, for example.

The external electrode 14a is not only provided on all of the first end surface 15a of the laminate 11, but also extends to a first principal surface 16a, a second principal surface 16b, a first side surface 17a, and a second side surface 17b from the first end surface 15a. In addition, the external electrode 14b is not only provided on all of the second end surface 15b of the laminate 11, but also extends to the first principal surface 16a, the second principal surface 16b, the first side surface 17a, and the second side surface 17b from the second end surface 15b.

The external electrode 14a is electrically connected to the first internal electrode 13a, and the external electrode 14b is electrically connected to the second internal electrode 13b.

The external electrodes 14 (14a and 14b) each include a base electrode layer, and a plating layer disposed on the base electrode layer, for example.

The base electrode layer may include at least one of a baked electrode layer, a resin electrode layer, and a thin film electrode layer, such as described below.

The baked electrode layer contains glass and metal, and may be a single layer or multiple layers. The metal contained in the baked electrode layer contains at least one of Cu, Ni, Ag, Pd, an alloy of Ag and Pd, Au, and the like, for example.

The baked electrode layer is preferably formed by applying a conductive paste containing glass and metal to the laminate 11 and baking the conductive paste. The baking may be simultaneously performed with firing of the laminate 11, or may be performed after firing of the laminate 11.

It is preferable that a thickness of the baked electrode layer, more specifically a thickness of the thickest portion thereof, is not less than about 10 μm and not more than about 30 μm, for example.

A base electrode layer may be a resin electrode layer containing conductive grains and a thermosetting resin, for example. When the resin electrode layer is formed, the resin electrode layer may be directly formed on the laminate without forming the baked electrode layer. In addition, when the resin electrode layer is formed, the resin electrode layer may be formed on only an end surface of the laminate. The resin electrode layer may be a single layer or multiple layers.

When the resin electrode layer is formed on the baked electrode layer, the baked electrode layer and the resin electrode layer are formed so as to extend from an end surface of the laminate to a portion of a principal surface and a side surface thereof. At this time, the amount of extension of the resin electrode layer to the principal surface and the side surface may be less than the amount of extension of the baked electrode layer to the principal surface and the side surface. That is, no resin electrode layer is formed on an edge of the baked electrode layer on the principal surface and on an edge thereof on the side surface, and a plating layer described below is directly formed on each of the edges.

The base electrode layer may include a thin film electrode layer, as described above. The thin film electrode layer is a layer of about 1 μm or less in thickness, in which metal grains are deposited, and is formed by a well-known thin film forming method, such as a sputtering method and an evaporation method, for example.

The plating layer disposed on the base electrode layer contains at least one of Cu, Ni, Ag, Pd, an alloy of Ag and Pd, Au, and the like, for example. The plating layer may be a single layer or multiple layers.

It is preferable that the plating layer is a two-layer structure of an Ni-plating layer and an Sn-plating layer.

The Ni plating layer prevents the base electrode layer from being eroded by solder used when the multilayer ceramic capacitor 10 is mounted. The Sn-plating layer enhances solder wettability when the multilayer ceramic capacitor 10 is mounted.

The external electrode 14 may include a plating layer that is directly disposed on the laminate 11 without including the underlying electrode layer described above. In this case, the plating layer is directly connected to the first internal electrode 13a or the second internal electrode 13b.

It is preferable that a thickness of the plating layer per layer is not less than about 2 μm and not more than about 6 μm, for example.

Like a two-layer structure of the Ni-plating layer and the Sn-plating layer described above, it is preferable that the plating layer includes a first plating layer, and a second plating layer provided on the first plating layer. It is preferable that the first plating layer and the second plating layer each contain one kind of metal selected from a group consisting of Cu, Ni, Sn, Pb, Au, Ag, Pd, Bi, and Zn, or an alloy containing the metal, for example.

For example, when Ni is used as the internal electrode 13, it is preferable to use Cu having good bondability with Ni for the first plating layer. In addition, it is preferable to use Sn or Au having good solder wettability for the second plating layer. For the first plating layer, Ni having solder barrier performance may be used.

The second plating layer may be formed as needed. In addition, another plating layer formed on the second plating layer may be further provided in addition to the first plating layer and the second plating layer.

It is preferable that the plating layer has a metal ratio of about 99% or more by volume. In addition, it is preferable that the plating layer does not contain glass.

A thickness of each of the plurality of dielectric ceramic layers 122, as well as a thickness of each of the plurality of internal electrodes 13 (13a and 13b), can be measured by the following method. While a method for measuring a thickness of the dielectric ceramic layer 122 will be described below, the same applies to a method of measuring a thickness of the internal electrode 13.

First, the laminate 11 is ground to expose a section defined along the thickness direction and the width direction of the laminate 11, and then the exposed section is observed with a scanning electron microscope. In the exposed section, a thickness of the dielectric ceramic layer 122 is measured on respective five lines of a total of a center line passing through the center of the laminate 11 in the width direction, along the thickness direction, and two lines drawn on each side across the center line at equal or substantially equal intervals. Then, an average value of the five measurement values is indicated as a thickness of the dielectric ceramic layer 122.

To acquire a more accurate value, the laminate 11 is divided into an upper portion, a central portion, and a lower portion, in the thickness direction, and the five measurement values described above are acquired in each of the upper portion, the central portion, and the lower portion. Then, an average value of all of the measurement values acquired is indicated as a thickness of the dielectric ceramic layer 122.

A mole ratio of at least one element to Ti contained in the perovskite compound, the at least one element being selected from a group consisting of Ba, Mg, Mn and a rare-earth element, is able to be acquired by the following method.

First, a surface of the multilayer ceramic capacitor 10 at a center position thereof in the lengthwise direction is ground until a section defined along the thickness direction and the width direction is exposed. Subsequently, an X-ray spectrum is acquired with a field emission wavelength-dispersive X-ray spectrometer (FE-WDX) for each of the first region 123a, the second region 123b, the third region 123c, the fourth region 123d of the crosswise outer ceramic layer 123, and the dielectric ceramic layer 122. Then an element ratio, or a mole ratio of at least one element selected from a group consisting of Ba, Mg, Mn, and a rare-earth element to Ti, is acquired on the basis of acquired X-ray spectra.

It is preferable to acquire a plurality of values of the mole ratio for a respective plurality of places in each of the first region 123a, the second region 123b, the third region 123c, the fourth region 123d of the crosswise outer ceramic layer 123, and the dielectric ceramic layer 122. For example, ten mole ratios are acquired for respective predetermined ten places in each of the regions, and then an average value of acquired ten mole ratios is indicated as the corresponding one of mole ratios S1, S2, SS1, SS2, and Sa of the corresponding regions.

First, a mother ceramic green sheet is prepared. The mother ceramic green sheet after being fired contains a perovskite compound containing Ba and Ti, and at least one element selected from a group consisting of Ba, Mg, Mn and a rare-earth element, and contains a material to be dielectric ceramic being barium-titanate-based ceramic, for example.

The mother ceramic green sheet is formed by applying ceramic slurry acquired by combining a binder and a solvent with the dielectric ceramic material powder described above, while dispersing the binder and the solvent, to a polyethylene terephthalate (PET) film and drying the ceramic slurry, for example. It is preferable that the ceramic slurry is applied so as to have a thickness not less than about 0.2 μm and not more than about 10 μm, and can be applied by using various methods such as die coater and screen printing.

Subsequently, a conductive paste for internal electrodes is prepared. The conductive paste for internal electrodes contains an Ni-powder, a solvent, a disperser, a binder, and the like, and is adjusted so as to have a uniform viscosity.

Figure 4A:
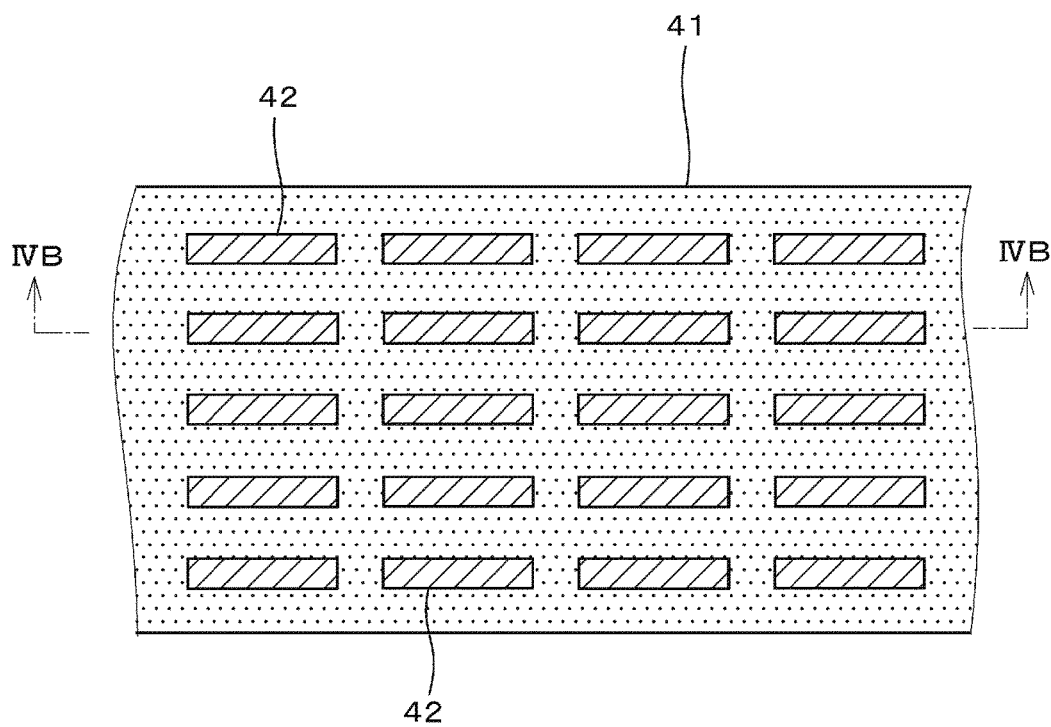
FIGS. 4A and 4B illustrate a mother ceramic green sheet on which a conductive paste for internal electrodes is applied, FIG. 4A being a plan view, and FIG. 4B being a sectional view taken along line IVB-IVB of FIG. 4A.
Figure 4B:
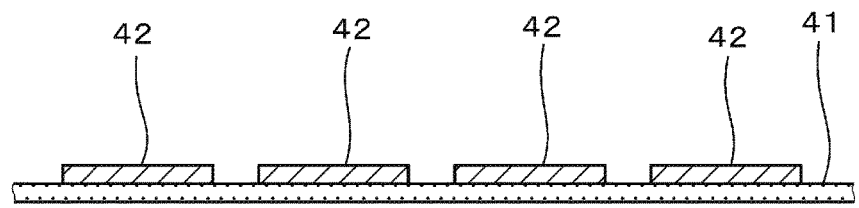

Subsequently, as illustrated in FIGS. 4A and 4B, a mother ceramic green sheet 41 is printed with the conductive paste for internal electrodes by screen printing or gravure printing, for example, to form a predetermined number of internal electrode patterns 42 that are to be the first internal electrodes 13a and the second internal electrodes 13b. FIG. 4A is a plan view, and FIG. 4B is a sectional view taken along line IVB-IVB of FIG. 4A.

Figure 5:
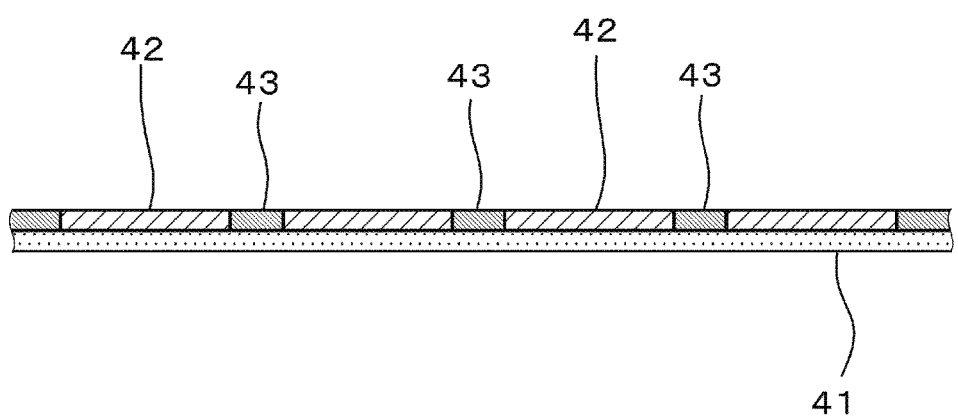
FIG. 5 illustrates ceramic slurry for forming the first region and the second region each outside in the dielectric ceramic layer in the width direction, the ceramic slurry being applied to a region in a surface of a mother ceramic green sheet, where no internal electrode pattern is formed.

Subsequently, as illustrated in FIG. 5, a region in a surface of the mother ceramic green sheet 41, where no internal electrode pattern 42 is formed, is printed with ceramic slurry 43 for forming the first region 123a and the second region 123b of the crosswise outer ceramic layer 123 by screen printing or gravure printing, for example.

The ceramic slurry 43 is acquired by combining a binder and a solvent with dielectric ceramic material powder containing a perovskite compound containing Ba and Ti, and at least one element selected from a group consisting of Ba, Mg, Mn and a rare-earth element, while dispersing the binder and the solvent. The ceramic slurry 43 has a content of at least one element selected from a group consisting of Ba, Mg, Mn, and a rare-earth element, to Ti, the content being less than that of the mother ceramic green sheet 41.

This allows relationships (1) and (2) are satisfied in the multilayer ceramic capacitor 10.

Figure 6:
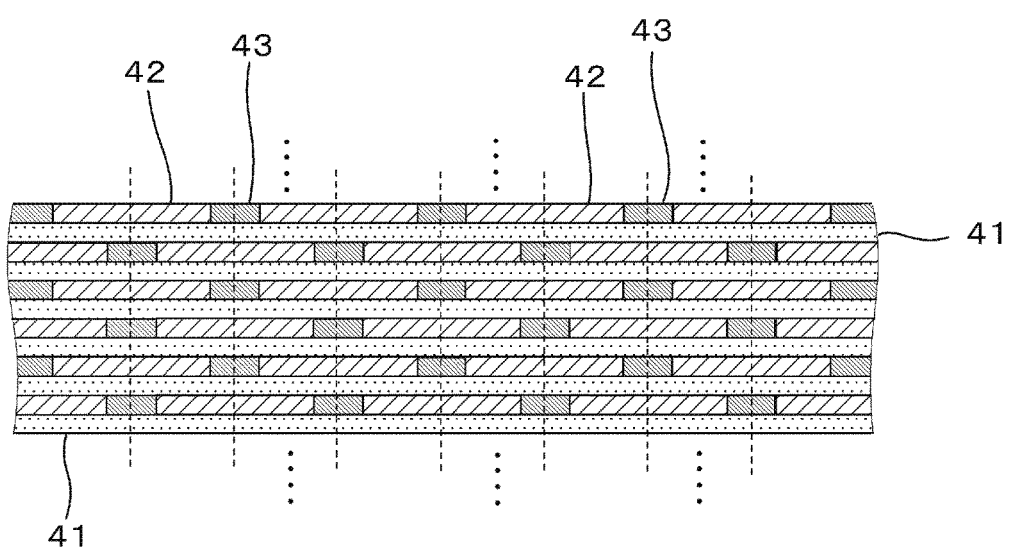
FIG. 6 illustrates a plurality of mother ceramic green sheets on each of which internal electrode patterns and ceramic slurry are printed, the plurality of mother ceramic green sheets being stacked with each other while being displaced from each other in a predetermined form.

Subsequently, a plurality of mother ceramic green sheets 41, on each of which the internal electrode patterns 42 and the ceramic slurry 43 are printed in a similar manner, is stacked with each other while being displaced from each other in a predetermined structure, as illustrated in FIG. 6. At this time, while FIG. 6 does not illustrate, a predetermined number of mother ceramic green sheets 41 each of which includes no internal electrode pattern 42, and is to be the outer ceramic layer 121, is stacked on a lower side and an upper side in a lamination direction.

Then, the stacked mother ceramic green sheets 41 are bonded to each other by being pressed in the lamination direction by a rigid press or an isostatic press to acquire a non-fired mother laminate. At this time, when pressed at a predetermined temperature, the ceramic green sheets closely adhere to each other. In FIG. 6, positions, at each of which the non-fired mother laminate is cut to acquire a non-fired laminate in a step described below, are indicated by respective broken lines.

When a resin sheet with a predetermined thickness is disposed in an outermost layer and is pressed, pressure is applied to a portion without an internal electrode pattern to enable mutual adhesive strength of ceramic green sheets to be increased.

Figure 7A:
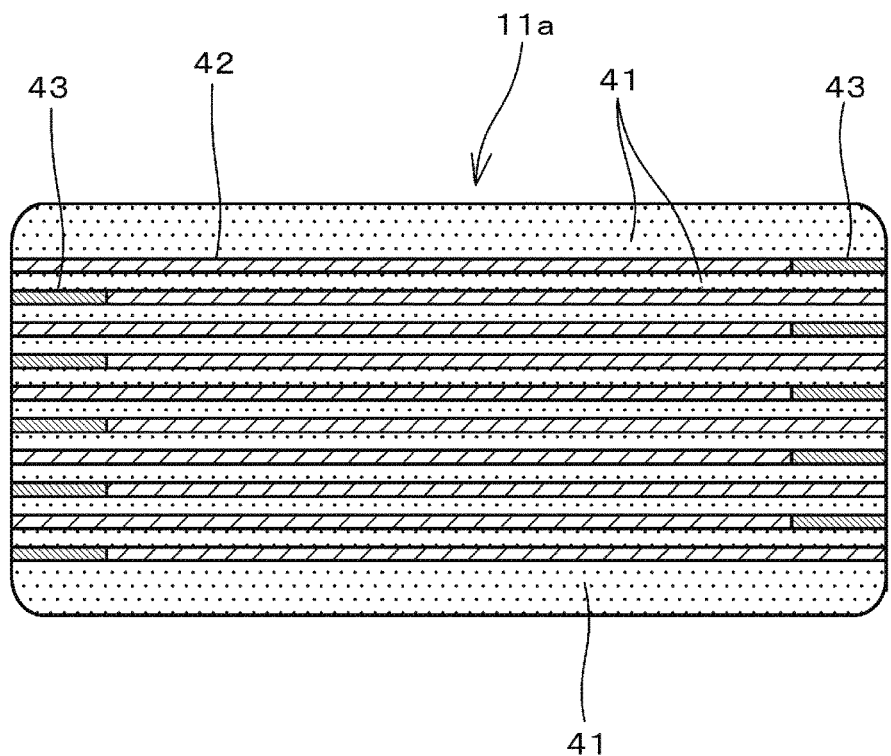
FIGS. 7A and 7B illustrate a non-fired laminate, FIG. 7A being a sectional view taken along the lengthwise direction, and FIG. 7B being a sectional view taken along the width direction.
Figure 7B:
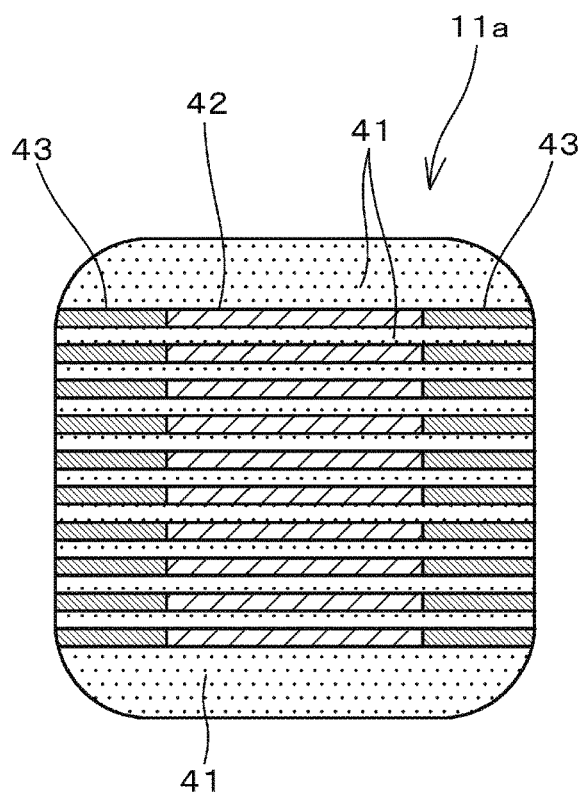

After that, the non-fired mother laminate is cut at predetermined positions by one of various methods, such as cutting with a dicing machine, and pressing and cutting, and then corners and ridge line potions of the respective cut non-fired laminates are rounded by barrel finishing or the like to acquire individual non-fired laminates 11a each with a structure such as illustrated in FIGS. 7A and 7B. FIG. 7A is a sectional view taken along the lengthwise direction, and FIG. 7B is a sectional view taken along the width direction.

When each of the non-fired laminates 11a acquired as described above is fired to diffuse at least one element selected from a group consisting of Ba, Mg, Mn, and a rare-earth element, contained in the third region 123c and the fourth region 123d, to the first region 123a and the second region 123b, the laminate 11 with the structure illustrated in each of FIGS. 1 to 3 is acquired. To diffuse the element contained in the third region 123c and the fourth region 123d to the first region 123a and the second region 123b, conditions during firing, such as firing atmosphere, firing temperature, and firing time, are appropriately adjusted. When the at least one element contained in the third region 123c and the fourth region 123d is diffused to the first region 123a and second region 123b, the relationships (3) and (4) are satisfied.

That is, when a content of at least one element selected from a group consisting of Ba, Mg, Mn, and a rare-earth element, to Ti in the first region 123a and the second region 123b is set less than that of the third region 123c and the fourth region 123d, the at least one element is diffused from the third region 123c and the fourth region 123d to the first region 123a and the second region 123b in a step of firing. As a result, a mole ratio SS1 of the at least one element to Ti in the third region 123c and a mole ratio SS2 of the at least one element to Ti in the fourth region 123d are able to be less than a mole ratio Sa of the at least one element to Ti in the dielectric ceramic layer 122.

In addition, diffusion of the at least one element from the third region 123c and the fourth region 123d to the first region 123a and the second region 123b occurs based on a concentration difference in the at least one element, so that a concentration of the at least one element in the third region 123c and the fourth region 123d is usually held more than a concentration of the at least one element in the first region 123a and the second region 123b even after the at least one element is diffused in the step of firing.

As a result, relationships (5) and (6) described above, or S1<SS1<Sa, and S2<SS2<Sa, are satisfied.

Figure 8:
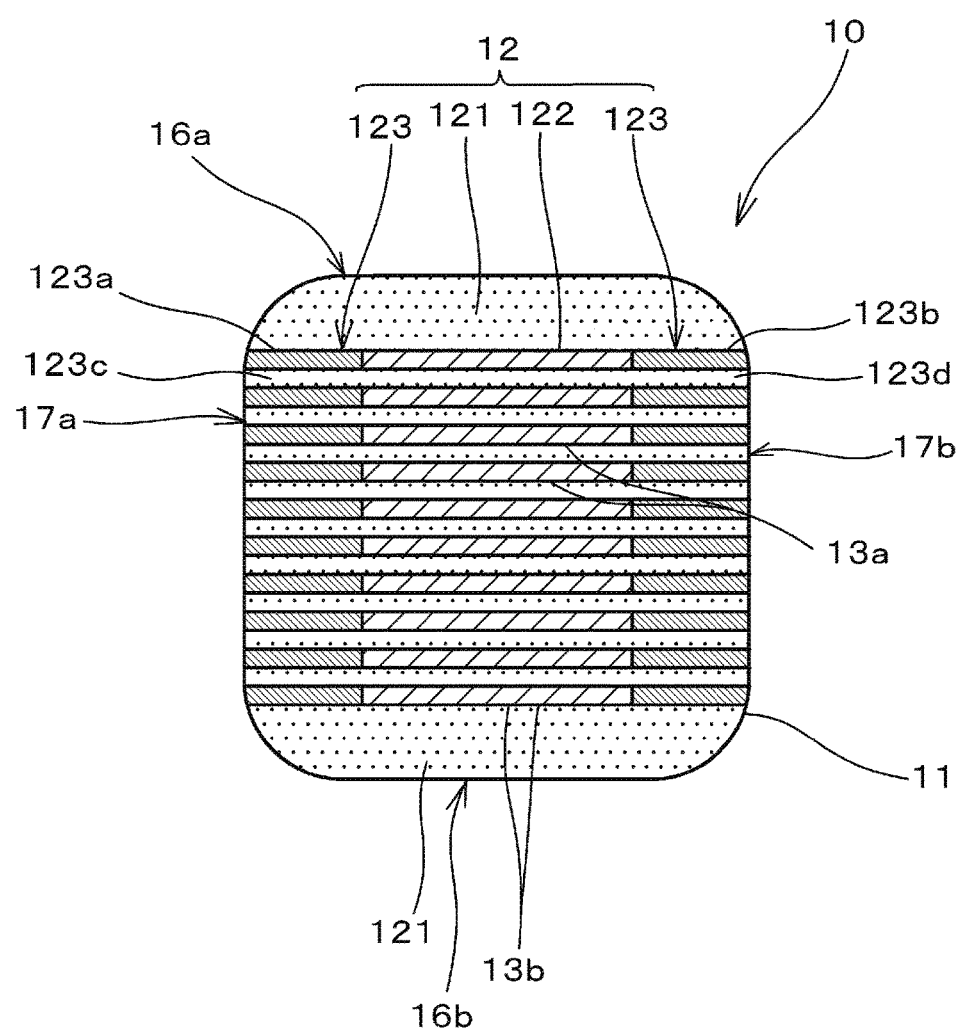
FIG. 8 illustrates a structure of a laminate that is acquired when fired under conditions where at least one element being selected from a group consisting of Ba, Mg, Mn and a rare-earth element is not diffused.

When the non-fired laminate 11a is fired under conditions where the at least one element is not diffused, a laminate 11 with a structure illustrated in FIG. 8 is acquired. FIG. 8 is a sectional view along the width direction. In the laminate 11 with the structure illustrated in FIG. 8, a mole ratio Sa of the at least one element to Ti in the dielectric ceramic layer 122 is identical to a mole ratio SS1 of the at least one element to Ti in the third region 123c and a mole ratio SS2 of the at least one element to Ti in the fourth region 123d. That is, the relationships (1) and (2) described above are satisfied, however, the relationships (3) to (6) are not satisfied.

When the relationships (1) and (2) are satisfied, even the laminate 11 with a structure like the structure illustrated in FIG. 8 allows ceramic layers in the first region 123a and the second region 123b in the multilayer ceramic capacitor 10 to increase in density. This enables reduction in entry of moisture toward the inside of the laminate 11, so that the multilayer ceramic capacitor 10 is able to be improved in moisture resistance.

Subsequently, a conductive paste for external electrodes is applied to the laminate 11. Specifically, the conductive paste for external electrodes is applied to all end surfaces of the laminate 11, and is applied so as to extend from the end surfaces to principal surfaces and side surfaces. Before application of the conductive paste for external electrodes, oil repellent treatment may be preliminarily applied to the surfaces of the laminate 11 to prevent excess spread of the conductive paste.

The conductive paste for forming external electrodes is dried, and then is baked. This forms a base electrode layer of an external electrode.

After that, plating is applied to form a plating layer on the base electrode layer. Before the plating, hydrophilic treatment may be preliminarily applied to the laminate 11 so that the laminate 11 has an affinity for plating liquid.

Through the steps described above, the multilayer ceramic capacitor 10 is formed.

Tests for evaluating moisture resistance reliability of a multilayer ceramic capacitor 10 of the present preferred embodiment and a conventional multilayer ceramic capacitor were performed. The conventional multilayer ceramic capacitor has the mole ratios S1, S2, SS1, SS2, and Sa described above that are substantially identical, and thus relationships (1) to (6) above are not satisfied.

In the moisture resistance reliability test, one hundred multilayer ceramic capacitors 10 of the present preferred embodiment and one hundred conventional multilayer ceramic capacitors were prepared, and voltage twice a rated voltage was applied to the multilayer ceramic capacitors for about 12 hours under conditions with a temperature of about 85° C., and a humidity of about 85%, and then a multilayer ceramic capacitor with resistance dropped to about 1/10 or less of an initial value was determined as "NG" (defect).

Zero multilayer ceramic capacitor was determined as "NG" in the one hundred multilayer ceramic capacitors 10 of the present preferred embodiment. In contrast, ten multilayer ceramic capacitors were determined as "NG" in the one hundred conventional multilayer ceramic capacitors.

That is, it can be seen that the multilayer ceramic capacitor 10 of the present preferred embodiment satisfying relationships (1) to (4) above, more particularly relationships of (1) and (2) above, was improved in moisture resistance as compared with the conventional multilayer ceramic capacitor.

The present invention is not limited to the preferred embodiments described above, and various applications and modifications can be added within the scope of the present invention.

For example, in a manufacturing process of a multilayer ceramic capacitor, a non-fired laminate and a conductive paste for external electrodes may be simultaneously fired.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a laminate including a plurality of dielectric layers and internal electrodes that are alternately stacked with each other; and
   a pair of external electrodes each of which is provided on a surface of the laminate to be electrically connected to the internal electrodes extended to the surface of the laminate; wherein
   the laminate includes:
      a first principal surface and a second principal surface, facing each other in a thickness direction being a lamination direction of the dielectric layers and the internal electrodes;
      a first end surface and a second end surface, facing each other in a lengthwise direction being a direction in which the pair of external electrodes faces each other, and being provided with the corresponding external electrodes; and
      a first side surface and a second side surface, facing each other in a width direction perpendicular or substantially perpendicular to the thickness direction and the lengthwise direction; wherein
      the dielectric layers, a first region positioned between the internal electrode and the first side surface in the width direction, and a second region positioned between the internal electrode and the second side surface in the width direction, in portions of the laminate, include a perovskite compound containing Ba and Ti, and at least one element selected from a group consisting of Ba, Mg, Mn and a rare-earth element; and
   relationships S1<Sa, and S2<Sa are satisfied where a mole ratio of the at least one element to the Ti in the first region, a mole ratio of the at least one element to the Ti in the second region, and a mole ratio of the at least one element to the Ti in one of the plurality of dielectric layer positioned between the internal electrodes, are S1, S2, and Sa, respectively.

2. The multilayer ceramic capacitor according to claim 1, wherein
   each of a third region positioned between one of the plurality of dielectric layers and the first side surface in the width direction, and a fourth region positioned between one of the plurality of dielectric layers and the second side surface in the width direction, in the portions of the laminate, includes a perovskite compound containing Ba and Ti, and at least one element selected from a group consisting of Ba, Mg, Mn and a rare-earth element; and relationships SS1<Sa and SS2<Sa are satisfied, where a mole ratio of the at least one element to the Ti in the third region, and a mole ratio of the at least one element to the Ti in the fourth region, are SS1 and SS2, respectively.

3. The multilayer ceramic capacitor according to claim 2, wherein
a relationship S1<SS1<Sa is satisfied; and
a relationship S2<SS2<Sa is satisfied.

4. The multilayer ceramic capacitor according to claim 1, wherein a dimension of the first region in the width direction and a dimension of the second region in the width direction, is not less than about 2 μm and not more than about 30 μm.

5. The multilayer ceramic capacitor according to claim 1, wherein the one of the plurality of dielectric layers has a thickness of not less than about 0.4 μm and not more than about 0.8 μm.

6. The multilayer ceramic capacitor according to claim 1, wherein the laminate is rectangular or substantially rectangular parallelepiped in shape.

7. The multilayer ceramic capacitor according to claim 1, wherein the laminate includes rounded corners and rounded ridge line portions.

8. The multilayer ceramic capacitor according to claim 1, wherein an outer one of the plurality of dielectric layers has a thickness of about 10 μm or more.

9. The multilayer ceramic capacitor according to claim 1, wherein a number of the plurality of dielectric layers included in the laminate is not less than 150 and not more than 200.

10. The multilayer ceramic capacitor according to claim 1, wherein ones of the plurality of dielectric layers included in the first region and the second region have a greater density than ones of the plurality of dielectric layers positioned outside of the first region and the second region.

11. The multilayer ceramic capacitor according to claim 2, wherein ones of the plurality of dielectric layers included in the third region and the fourth region have a greater density than ones of the plurality of dielectric layers positioned outside of the third region and the fourth region.

12. The multilayer ceramic capacitor according to claim 1, wherein the internal electrodes include dielectric grains.

13. The multilayer ceramic capacitor according to claim 1, wherein each of the internal electrodes has a thickness of not less than about 0.4 μm and not more than about 0.7 μm.

14. The multilayer ceramic capacitor according to claim 1, wherein a number of the internal electrodes is not less than 150 and not more than 200.

15. The multilayer ceramic capacitor according to claim 1, wherein each of the internal electrodes has a coverage ratio of not less than 60% and not more than 80%.

16. The multilayer ceramic capacitor according to claim 1, wherein the laminate includes longitudinal gaps defined by regions extending from leading ends of the internal electrodes on opposite sides of extended electrode portions to the first and second end surfaces of the laminate.

17. The multilayer ceramic capacitor according to claim 16, wherein a dimension each of the longitudinal gaps is not less than about 10 μm and not more than about 40 μm.

18. The multilayer ceramic capacitor according to claim 1, wherein each of the pair of external electrodes includes a base electrode layer on the laminate and a plating layer on the base electrode layer.

19. The multilayer ceramic capacitor according to claim 18, wherein the base electrode layer includes at least one of a baked electrode layer, a resin electrode layer, and a thin film electrode layer.

20. The multilayer ceramic capacitor according to claim 18, wherein the plating layer includes an Ni plating layer and an Sn plating layer.

* * * * *